(12) United States Patent
Kopansky et al.

(10) Patent No.: US 11,300,438 B2
(45) Date of Patent: Apr. 12, 2022

(54) ELECTRO-OPTIC LIQUID SENSOR

(71) Applicant: Eaton Intelligent Power Limited, Dublin (IE)

(72) Inventors: Gregory Kopansky, Philadelphia, PA (US); David A. Weiser, Philadelphia, PA (US); Thomas C. Gross, Honey Brook, PA (US); Xin Pu, Chester Springs, PA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/914,922

(22) Filed: Jun. 29, 2020

(65) Prior Publication Data

US 2021/0003441 A1     Jan. 7, 2021

Related U.S. Application Data

(60) Provisional application No. 62/869,789, filed on Jul. 2, 2019.

(51) Int. Cl.
    *G01F 23/292*       (2006.01)
    *G01D 11/26*       (2006.01)

(52) U.S. Cl.
    CPC .......... *G01F 23/2922* (2013.01); *G01D 11/26* (2013.01)

(58) Field of Classification Search
    None
    See application file for complete search history.

(56) References Cited

U.S. PATENT DOCUMENTS

| | | | | |
|---|---|---|---|---|
| 4,354,180 A | * | 10/1982 | Harding | G08B 29/04 250/577 |
| 5,257,539 A | * | 11/1993 | Gale | G01F 23/292 123/196 S |
| 5,514,920 A | * | 5/1996 | Key | G01M 3/38 307/118 |

(Continued)

FOREIGN PATENT DOCUMENTS

| | | |
|---|---|---|
| EP | 3318849 A1 | 5/2018 |
| JP | 2009014660 A | 1/2009 |
| WO | 15/038514 A1 | 3/2015 |

OTHER PUBLICATIONS

EP Search Report, EP20183566, dated Nov. 19, 2020.

*Primary Examiner* — Paul M. West
*Assistant Examiner* — Mark A Shabman
(74) *Attorney, Agent, or Firm* — Fishman Stewart PLLC

(57) ABSTRACT

A method of operating an electro-optic sensor includes disposing at least a portion of the electro-optic sensor in a liquid chamber, providing light from a light source of the electro-optic sensor at a first intensity, driving a light detector of the electro-optic sensor at a first sensitivity level, receiving, via the light detector, a first amount of light from the light source; determining whether liquid is present in the liquid chamber according to the first amount of light, providing light from the light source at a second intensity, driving the light detector at a second sensitivity level, receiving, via the light detector, a second amount of light from the light source, and/or confirming whether liquid is present in the liquid chamber according to the second amount of light. The first sensitivity level may be different from the second sensitivity level. An electro-optic sensor is also disclosed.

20 Claims, 11 Drawing Sheets

(56) References Cited

U.S. PATENT DOCUMENTS

| | | | |
|---|---|---|---|
| 6,040,897 A * | 3/2000 | Clifford | G01F 23/2928 356/4.01 |
| 6,049,088 A * | 4/2000 | Harding | G01F 23/2925 250/577 |
| 2016/0202108 A1 | 7/2016 | Kopansky et al. | |
| 2018/0031407 A1 * | 2/2018 | Kopansky | G01F 23/2922 |

* cited by examiner

ELECTRO-OPTIC LIQUID SENSOR

CROSS-REFERENCE TO RELATED APPLICATION

This application claims priority to U.S. Provisional Application No. 62/869,789, filed on Jul. 2, 2019, the contents of which are herein incorporated by reference in their entirety.

TECHNICAL FIELD

The present disclosure relates generally to liquid sensors, including electro-optic liquid sensors.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Numerous components in numerous different fields are dependent on the presence or absence of liquid, or a certain amount of liquid. Accordingly, sensors have been developed for detecting the presence of fluid. One sensor type is an electro-optic sensor including a light source, a prism, and a light detector.

In electro-optic liquid sensors, light emitted from the light source may be returned to the light detector by the prism only if no liquid is present. If liquid is present, no light or limited light may be returned to the light detector.

There is a desire for solutions/options that minimize or eliminate one or more challenges or shortcomings of electro-optic sensors. The foregoing discussion is intended only to illustrate examples of the present field and should not be taken as a disavowal of scope.

SUMMARY

In embodiments, a method of operating an electro-optic sensor may include disposing at least a portion of the electro-optic sensor in a liquid chamber; providing light from a light source of the electro-optic sensor at a first intensity; driving a light detector of the electro-optic sensor at a first sensitivity level; receiving, via the light detector, a first amount of light from the light source; determining whether liquid is present in the liquid chamber according to the first amount of light; providing light from the light source at a second intensity; driving the light detector at a second sensitivity level; receiving, via the light detector, a second amount of light from the light source; and/or confirming whether liquid is present in the liquid chamber according to the second amount of light. The first sensitivity level may be different from the second sensitivity level. Determining whether liquid is present in the liquid chamber according to the first amount of light may include comparing the first amount of light to a threshold value, determining that liquid is present if the first amount of light is greater than the threshold value, and/or determining that liquid is not present if the first amount of light is not greater than the threshold value.

In embodiments, if the first amount of light is greater than the threshold value, the second intensity may be greater than the first intensity and the second sensitivity level may be more sensitive than the first sensitivity level. Confirming whether liquid is present in the liquid chamber may include confirming that liquid is present if the second amount of light is greater than a second threshold value and determining an error has occurred if the second amount of light is not greater than the second threshold value.

With embodiments, if the first amount of light is not greater than the threshold value, the second intensity may be less than the first intensity and the second sensitivity level may be less sensitive than the first sensitivity level (e.g., effectively a third intensity and a third sensitivity). Confirming whether liquid is present in the liquid chamber may include confirming that liquid is not present if the second amount of light is less than a third threshold value and determining an error has occurred if the second amount of light is not less than the third threshold value.

In embodiments, the electro-optic sensor may include a prism and a reflective optical member. The reflective optical member may be arranged to reflect light emitted by the light source to the light detector when a liquid is disposed between the light source and the reflective optical member. The light detector may include an optical head assembly disposed in the liquid chamber and an electronic module assembly disposed outside of the liquid chamber. The optical head assembly is connected to the electronic module assembly via one or more fiber optic cables. At least one fiber optic cable of the one or more fiber optic cables may be connected to a wall of the liquid chamber via a hermetically sealed fitting. The one or more fiber optic cables may include a single fiber. The method may include disposing all active components of the electro-optic sensor outside of the liquid chamber.

With embodiments, a method of operating an electro-optic sensor may include providing a liquid chamber; providing the electro-optic sensor including a light source and a light detector that may include a photodiode-based transimpedance amplifier; conducting a first test of the electro-optic sensor without liquid in the liquid chamber and with the light source off; conducting a second test of the electro-optic sensor without liquid in the liquid chamber and with the light source on; conducting a third test of the electro-optic sensor with liquid in the liquid chamber and with the light source off; conducting a fourth test of the electro-optic sensor with liquid in the liquid chamber and with the light source on; setting a threshold value for the electro-optic sensor according to results of the fourth test; and/or operating the electro-optic sensor in a normal operating mode, including determining that liquid is present in the liquid chamber if at least one of an intensity and an amount of light received by the light detector is less than the threshold value.

In embodiments, an electro-optic sensor may include an electronic module assembly; an optical head assembly configured to be disposed in a liquid chamber; and/or a fiber optic cable configured to connect the electronic module assembly with the optical head assembly. The fiber optic cable may include a first section, and/or a first section and a second section. In embodiments, a first section may include a first end configured for connection to the optical head assembly and a second end configured for connection or connecting through a wall of the liquid chamber. The fiber optic cable may include a second section with a first end configured for connection with the second end of the first section. The second end of the second section may be configured for connection with the electronic module assembly. An electro-optic sensor may include a first connector connected to the second end of the first section of the fiber optic cable, and a second connector connected to the first end of the second section of the fiber optic cable. The first connector and the second connector may be configured to be connected together. An electro-optic sensor may include a third connector connected to the second end of the second section of the fiber optic cable. The electronic module assembly may include a connector configured to be connected with the third connector. At least one of the first section and the second section may include a single fiber. An electro-optic sensor may include a light source configured to be driven at a plurality of intensities. The optical head assembly may be configured to receive light from the light source.

With embodiments, a fluid system may include an electro-optic sensor. The fluid system may include a liquid chamber. An optical head assembly may be disposed in the liquid chamber. The electronic module assembly may be disposed outside the liquid chamber. The first section of the fiber optic cable may be connected to the wall of the liquid chamber. The first section of the fiber optic cable may be connected to the wall via a hermetically sealed fitting. All active components of the electro-optic sensor may be disposed outside of the liquid chamber. The first end of the first section of the fiber optic cable may be connected to the optical head assembly via corresponding connectors.

Liquid sensors according to the present disclosure may improve on other electro-optic liquid sensors by providing capability for assessing the operational state of the sensor in the presence of liquid. In contrast, some electro-optic sensors are generally only capable of being tested while not in liquid. Accordingly, electro-optic sensors according to the present disclosure may enable improved testing and functionality over other electro-optic liquid sensors.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

Embodiments of the disclosure will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
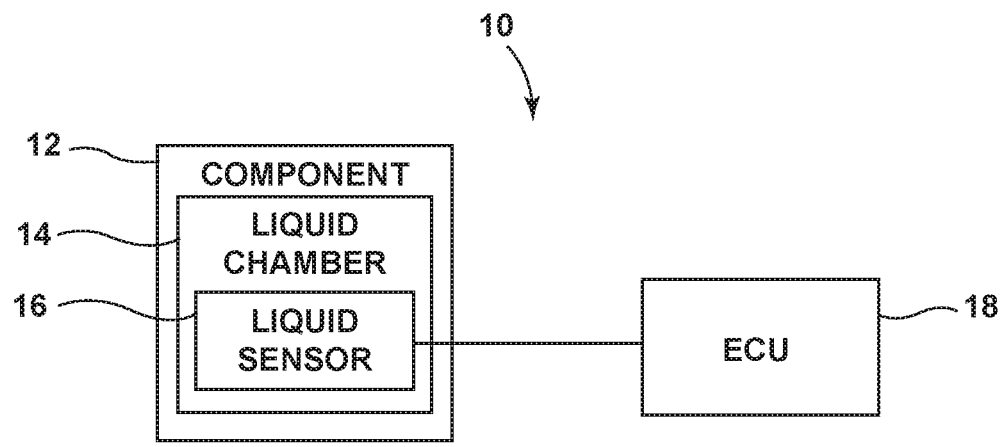
FIG. 1 is a block diagram view of an exemplary embodiment of a system including a component for which determining the presence of fluid may be desirable.

Referring to the figures, in which like reference numerals refer to the same or similar features in the various views, FIG. 1 is a block diagram view of a system 10 including a component 12 for which determining the presence of liquid may be desirable. The component 12 may include a liquid chamber 14, and the system 10 may include a liquid sensor 16 and/or an electronic control unit (ECU) 18.

In embodiments, the component 12 may be any component in any field that includes or may be exposed to liquid in its operation. For example, the component 12 may be or may be included in a mechanical, electrical, hydraulic, pneumatic, and/or other known actuator or actuation system. The component 12 may include a liquid chamber 14 configured to store and/or receive a liquid. The liquid may be, for example only, of a type necessary for the functionality of the component 12 (e.g., hydraulic fluid, liquid for lubrication, fuel, etc.), liquid incidental to the environment of the component 12, and/or liquid that is detrimental to the function of the component 12.

With embodiments, the liquid sensor 16 may be coupled with the component 12. For example, the liquid sensor 16 may be disposed at least partially within the liquid chamber 14 of the component 12. In embodiments, the liquid sensor 16 may be an electro-optic sensor, such as that described in conjunction with FIGS. 2-4 and/or FIGS. 8 and 9.

With continued reference to FIG. 1, an ECU 18 may be electrically coupled to the sensor 16 and may be configured to drive the sensor 16, receive feedback from the sensor 16, assess whether liquid is present or absent in the liquid chamber 14, and/or assess the operational state of the sensor 16. An ECU 18 may comprise, in embodiments, one or more of a processor, a non-volatile computer-readable memory, an application-specific integrated circuit (ASIC), field-programmable gate array (FPGA), and/or other known processing or memory devices. The ECU 18 may be or may comprise a dedicated processing resource for the sensor 16, or may be or may comprise processing resources for numerous sensors, components, and/or systems. The ECU 18 may be electrically coupled to the sensor 16 through known wired and/or wireless connections. The ECU 18 may be configured to perform various functions, including those described in greater detail herein, with appropriate programming instructions and/or code embodied in software, hardware, and/or other media. In embodiments, the ECU 18 may include a plurality of controllers. In embodiments, the ECU 18 may include and/or be connected to an input/output (I/O) interface and/or a display.

Figure 2:
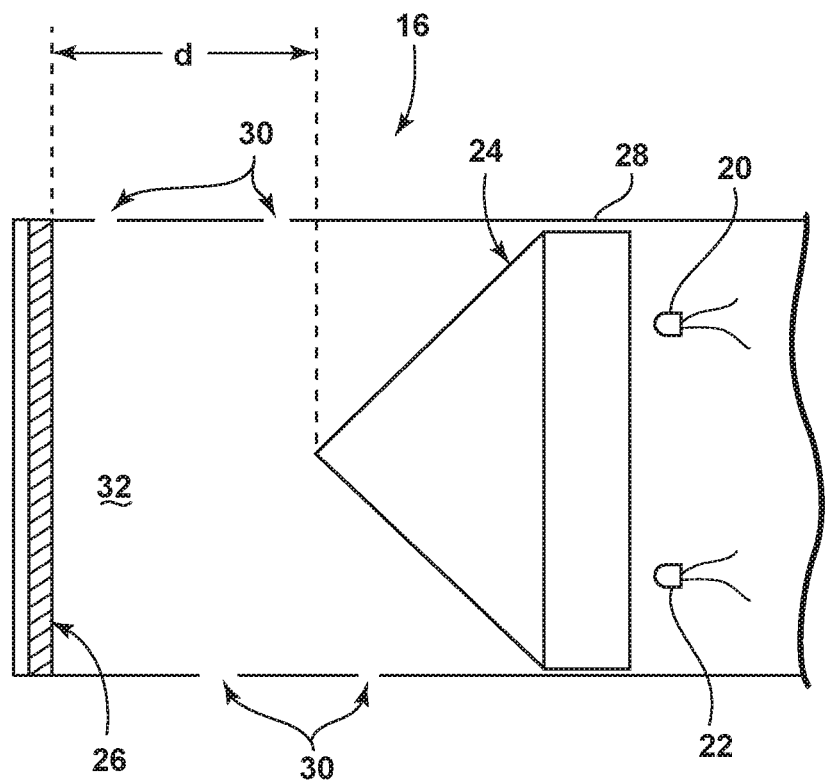
FIG. 2 is a diagrammatic view of an embodiment of an electro-optic liquid sensor.

FIG. 2 is a diagrammatic view of an embodiment of the electro-optic liquid sensor 16. The sensor 16 may include a light source 20, a light detector 22, a prism 24, and/or a reflective optical member 26 (which may also be referred to as an optical shield), which may be generally disposed within a housing 28. The housing 28 may include one or more liquid ports 30 for permitting liquid to flow into and out of a chamber 32 of the housing 28. The chamber 32 may define a gap between the prism 24 and the optical member 26 of a size d. For example, and without limitation, in an embodiment, d may be about an inch or less. Of course, other dimensions may be employed as appropriate for particular applications.

With embodiments, the light source 20 may be configured to emit light of one or more chosen frequencies and powers/intensities appropriate for a given application (e.g., appropriate for the characteristics of the other elements of the sensor 16, such as shape, orientation, materials, reflectivity, etc., and/or according to characteristics of the liquid to be detected, such as density, scattering properties, etc.). As used herein, a light frequency should be understood to include either or both of a specific frequency of light and a frequency band. In an embodiment, the light source 20 may be configured to emit light in the infrared portion and/or the near-infrared portion of the electromagnetic spectrum. The light source 20 may be or may include one or more of a light-emitting diode (LED), a laser, or other known light source, in an embodiment.

The light detector 22 may be configured, in an embodiment, to detect light of one or more frequencies of light, including at least the frequency of light emitted by the light source 20. The light detector 22 may be or may include one or more of a phototransistor, photodiode, and/or other light detecting device.

In embodiments, the prism 24 may include a member, article, and/or device comprising one or more components that may be configured in size, shape, and/or materials to reflect light/a light signal from the light source 20 to the light detector 22 in certain conditions and to pass light from the light source 20 through the prism 24 in certain conditions. For example only, the prism 24 may be configured to reflect light from the light source 20 to the light detector 22 when liquid is not present around the prism 24, and to pass light from the light source through the prism 24 when liquid is present around and/or near the prism 24 (e.g., in chamber 32). In an embodiment, for example only, the prism 24 may comprise borosilicate glass, fused silica (quartz), one or more polymers, etc., that is optically transmissive at least to light of the frequency or frequencies emitted by the light source 20. Thus, in an embodiment, the prism 24 may be optically-transmissive to light in the infrared and/or near-infrared portions of the electromagnetic spectrum, for example only.

With embodiments, a reflective optical member 26 may be arranged and configured to reflect light emitted by the light source 20 to the light detector 22, in certain conditions. The optical member 26 may have a degree of reflectivity for one or more frequencies of light that may be tailored for a particular application. In certain embodiments, the optical member 26 may have complete or near-complete reflectivity for the frequency or frequencies of light emitted by the light source 20. In other embodiments, the optical member 26 may have less-than-complete reflectivity for the frequency or frequencies of light emitted by the light source 20.

The reflective optical member 26 may be disposed, in an embodiment, on/at a side of the housing 28 opposite the light source 20 and the light detector 22. The light source 20 may emit light in the direction of the optical member 26. The prism 24 may be disposed at least partially between the light source 20 and the optical member 26, in an embodiment, and at least partially between the light detector 22 and the optical member 26, in an embodiment. Accordingly, in the embodiment generally illustrated in FIG. 2, light may travel from the light source 20, through the prism 24, through the chamber 32, to the optical member 26, and may be reflected by the optical member 26 back through the chamber 32 and prism 24 to the light detector 22, in certain conditions. The distance d between the optical member 26 and the prism 24 may be tailored to the geometric relationship between the optical member 26, prism 24, light detector 22, and light source 20, in an embodiment, for the optical member 26 to effectively reflect light emitted by the light source 20 to be returned to the light detector 22.

Figure 3:
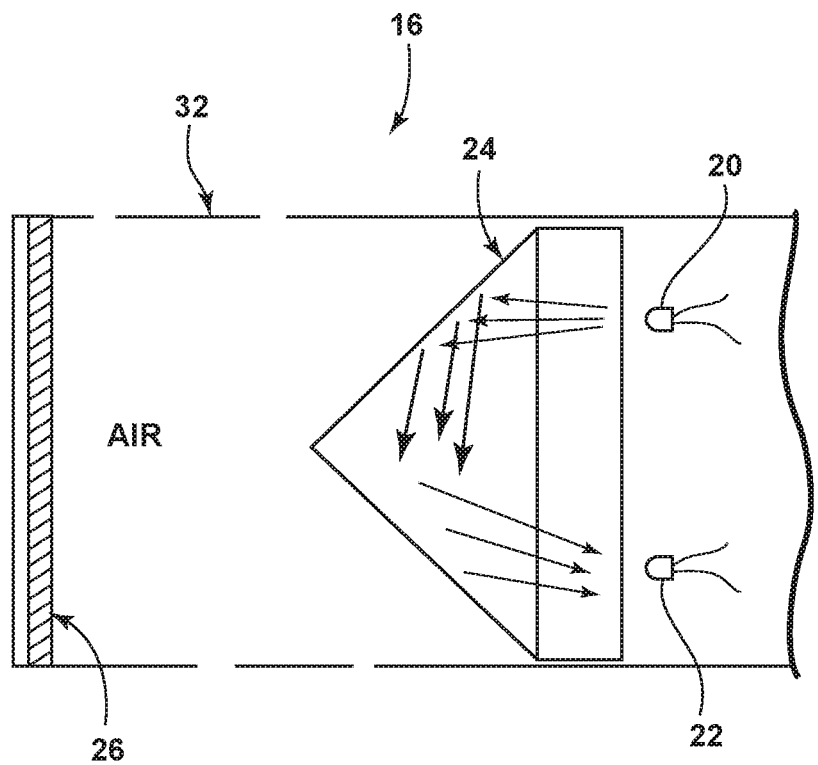
FIG. 3 is a diagrammatic view of the electro-optic liquid sensor of FIG. 2 illustrating the operation of the liquid sensor in the absence of liquid.
Figure 4:
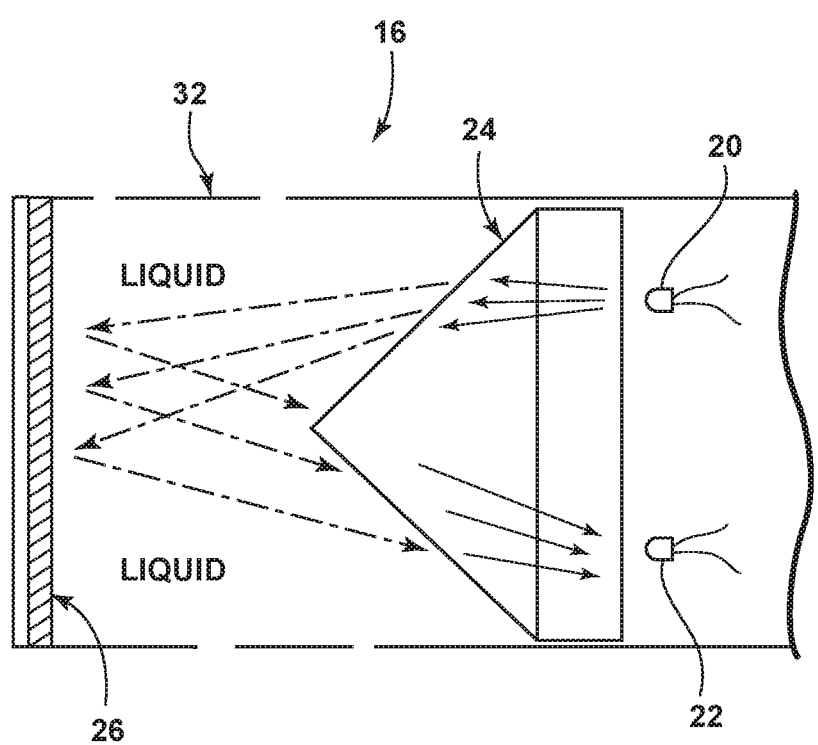
FIG. 4 is a diagrammatic view of the electro-optic liquid sensor of FIG. 2 illustrating the operation of the liquid sensor in the presence of liquid.

In embodiments, the electro-optic liquid sensor 16 may be configured to detect the presence of liquid by returning a different amount of light from the light source 20 to the light detector 22 when liquid is present in the chamber 32 than when liquid is not present in the chamber 32. For example, as shown in FIG. 3, when no liquid is present in the chamber 32, and the chamber 32 is filled with air, the prism 24 may return a first amount of light from the light source 20 to the light detector 22. In an embodiment, the prism 24 may return substantially all light emitted by the light source 20 to the light detector 22 when no liquid is present. In contrast, as shown in FIG. 4, when the chamber 32 is filled with liquid, the prism 24 may return very little of or none of the light from the light source 20 to the light detector 22. The prism 24 may pass some portion of the light emitted by the light source 20, some of which light may disperse in the liquid, and some of which light may propagate to the optical member 26, be reflected by the optical member 26 to the light detector 22, and be received by the light detector 22. Accordingly, a relatively higher amount of light received by the light detector 22 may be associated with the absence of liquid from the chamber 32, and a relatively smaller amount of light received by the light detector 22 may be associated with the presence of liquid in the chamber 32.

Embodiments of an electro-optic liquid sensor 16 may improve on other electro-optic sensors by enabling the sensor 16 to be tested in the presence of liquid. Other electro-optic sensors generally do not provide any means by which a light signal may be returned to the light detector in the presence of liquid. As a result, a faulty sensor may be indistinguishable from the presence of liquid in known sensors. In contrast, because the electro-optic sensor 16 of the present disclosure may return a light signal to the light detector 22 in the presence of liquid, a faulty sensor (which may always indicate zero light received by the light detector 22) may be distinguished from the presence of fluid (which may indicate a nonzero amount of light received by the light detector, but less light received by the light detector 22 than when liquid is absent).

Although embodiments of the electro-optic liquid sensor 16 are described herein with respect to particular materials, shapes, dimensions, light characteristics, etc., it should be understood that such details are exemplary only and are not limiting except as explicitly recited in the claims. Numerous modifications and alterations may be made within the spirit and scope of the present disclosure.

Referring to FIGS. 1 and 2, an ECU 18 may be configured to operate the electro-optic sensor 16 to determine whether liquid is present in the chamber 32 and to determine whether the sensor 16 is or is not operating properly (e.g., assess the operational state of the sensor 16). Accordingly, in an embodiment, the ECU 18 may be configured to operate the sensor 16 in a liquid detection mode and a test mode. The liquid detection mode and the test mode may be implemented separately by the ECU, or may be implemented together.

Figure 5:
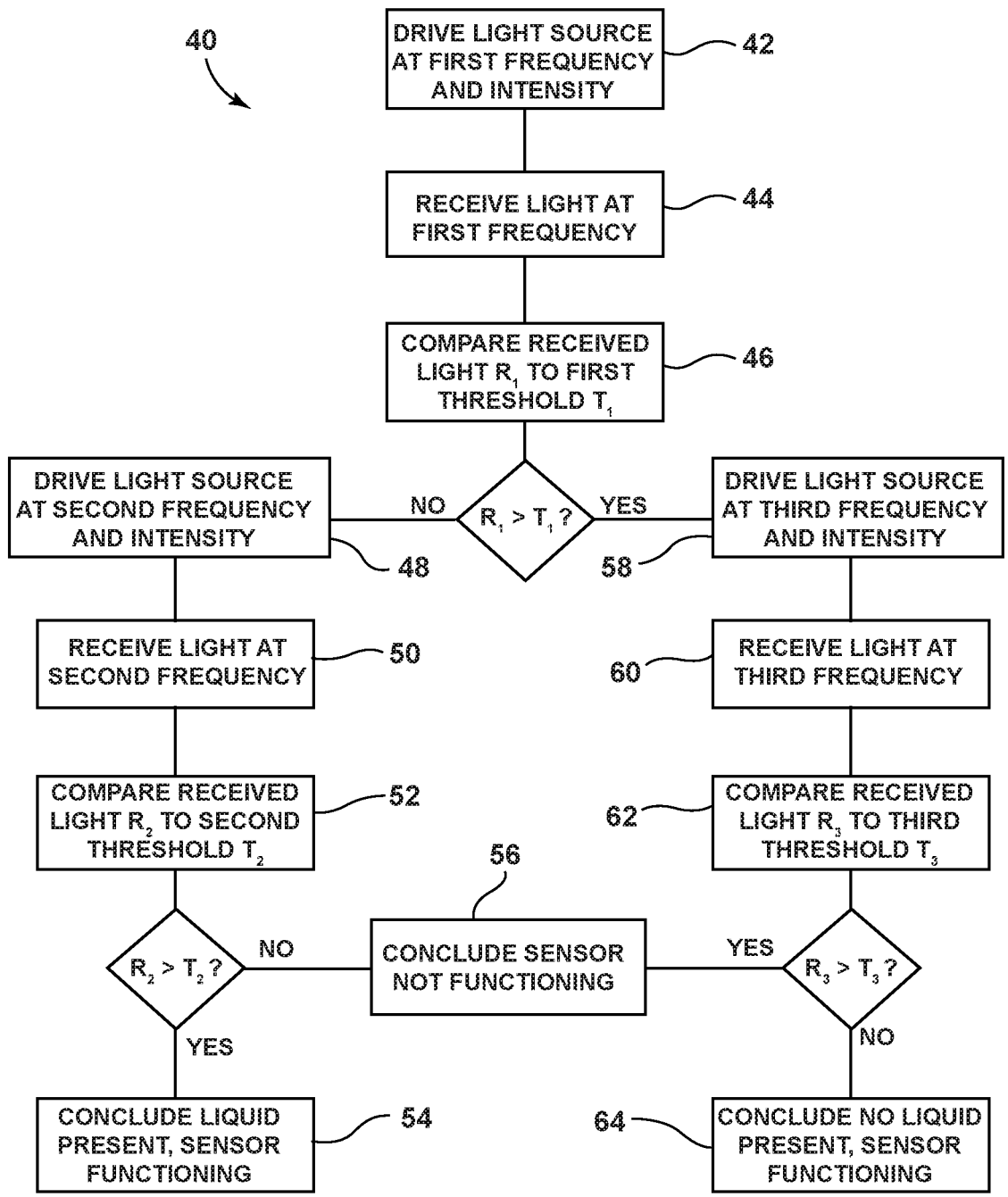
FIG. 5 is a flow chart illustrating an embodiment of a method of operating an electro-optic liquid sensor.

FIG. 5 is a flow chart generally illustrating a method 40 of operating an electro-optic sensor 16. One or more steps of the method 40 may be performed by the ECU 18 shown in FIG. 1 to operate the sensor 16 of FIG. 2. The method 40 may include steps for implementing a liquid detection mode and a test mode of the electro-optic sensor 16 together.

Referring to FIGS. 2 and 5, an embodiment of a method 40 may begin with a first driving step 42 that includes driving (e.g., providing light from) the light source 20 at a first frequency and intensity. The frequency and intensity may be selected according to the characteristics of the components of the sensor 16 and/or according to the liquid to be detected. The method 40 may continue to a first receiving step 44 that may include receiving reflected light with the light detector 22. The received light may be of the same frequency as that emitted by the light source 20 in the first driving step 42. In a first comparison step 46, the amount or intensity or light received, $R_1$, may be compared to a first threshold, $T_1$.

With embodiments, if the amount or intensity of light $R_1$ detected in the first receiving step 44 is less than the first threshold $T_1$, the method 40 may continue to a second driving step 48 that includes driving the light source 20 at a second frequency and intensity. The second frequency may be the same as the first frequency, in an embodiment. The second intensity may be the same as the first intensity, in an embodiment. In another embodiment, the second frequency and/or intensity may be different from the first frequency and/or intensity. For example only, the second intensity may be greater than the first intensity, in an embodiment. A higher intensity may be used in the second driving step 48 than in the first driving step 42 to ensure that, if liquid is present, the light will have sufficient energy to propagate through the liquid from the light source 20 to the optical member 26 and back to the light detector 22. Thus, as in the first driving step 42, the frequency and intensity of light in the second driving step 48 may be selected according to the type of liquid to be detected and the characteristics of the elements of the sensor.

In embodiments, the method 40 may continue to a second receiving step 50 that includes receiving reflected light with the light detector 22. The received light may be of the same frequency as that emitted by the light source 20 in the second driving step 48. In a second comparison step 52, the amount or intensity or light received, $R_2$, may be compared to a second threshold, $T_2$. If the amount or intensity of light received is greater than the second threshold (e.g., if $R_2>T_2$), it may be concluded at a first conclusion step 54 that liquid is present and that the sensor 16 is functioning properly. If the amount or intensity of light received $R_2$ is not greater than the second threshold $T_2$, it may be concluded at a second conclusion step 56 that the sensor 16 is not functioning properly.

With embodiments, in the first comparison step 46, if the amount or intensity of light received is greater than the first threshold (e.g., if $R_1>T_1$), the method 40 may advance to a third driving step 58 that may include driving the light source 20 at a third frequency and intensity. The third frequency may be the same as either or both of the first frequency and the second frequency, in an embodiment. The third intensity may be the same as either or both of the first intensity and the second intensity, in an embodiment. In another embodiment, the third frequency and/or intensity may be different from either or both of the first and second frequency and/or intensity. The frequency and intensity of light in the third driving step 58 may be selected according to the type of liquid to be detected and the characteristics of the elements of the sensor.

In embodiments, the method 40 may continue to a third receiving step 60 that includes receiving reflected light with the light detector 22. The received light may be of the same frequency as that emitted by the light source 20 in the third driving step 58. In a third comparison step 62, the amount or intensity or light received, $R_3$, may be compared to a third threshold, $T_3$. The third threshold $T_3$ may be set to an amount or intensity of light that is higher than a properly-functioning sensor could detect given the amount or intensity of light emitted in the third driving step 58. If the amount or intensity of light $R_3$ received is less than the third threshold $T_3$, it may be concluded at a third conclusion step 64 that no liquid is present and that the sensor 16 is functioning properly. If the amount or intensity of light received $R_3$ is greater than the third threshold $T_3$, it may be concluded again at the second conclusion step 56 that the sensor 16 is not functioning properly.

With embodiments, the thresholds $T_1$, $T_2$, $T_3$ for determining whether liquid is present and whether the sensor 16 is functioning properly may be selected according to the characteristics of the liquid to be detected and the characteristics of the elements of the sensor 16. Additionally or alternatively, the thresholds $T_1$, $T_2$, $T_3$ may be experimentally determined.

In embodiments, the steps of the method 40 may be performed repeatedly, in an embodiment, to assess whether liquid is present and whether the sensor 16 is functioning properly on an ongoing basis. That is, a continuous loop of driving the light source 20, receiving light with the light detector 22, and comparing the amount or intensity of light received to one or more thresholds may be executed. In an embodiment in which the first, second, and third driving steps 42, 48, 58 utilize the same frequency and intensity of light, the light source 20 may be continuously driven at a single frequency and intensity.

In an alternate embodiment, the third driving, receiving, and comparing steps 58, 60, 62 may be omitted and, if the first amount of received light $R_1$ is greater than the first threshold $T_1$, it may be concluded that no liquid is present.

The first driving, receiving, and comparing steps 42, 44, 46 may be considered steps in an embodiment of a method of assessing the presence of liquid (e.g., a liquid detection mode). The second and third driving, receiving, and comparing steps 48, 50, 52, 58, 60, 62 may be considered steps in an embodiment of a method of assessing the operational state of the sensor (e.g., a testing mode). The liquid presence assessment method may be performed separately and independently from the operational state assessment method, in an embodiment. For example, the operational state assessment method steps 48, 50, 52, 58, 60, 62 may be performed on a less-frequent basis than the liquid presence assessment steps 42, 44, 46, in an embodiment. Furthermore, although methods (e.g., method 40) may be illustrated and described such that operational state assessment steps (e.g., steps 48, 50, 52, 58, 60, 62) are only performed after performing liquid presence assessment steps (e.g., steps 42, 44, 46), such description and illustration is exemplary only. In an embodiment, the operational state assessment steps 48, 50, 52, 58, 60, 62 may be performed regardless of performance of the liquid presence assessment steps 42, 44, 46.

With embodiments, increasing the intensity of the light source 20 may involve providing a relatively high electrical current to the light source 20 and/or creating a temporary current spike in sensor power consumption. In some embodiments, the degree to which the intensity of light from light source 20 can be increased (e.g., via increasing electrical current) may be limited. For example, and without limitation, there may be limits on available electrical current and/or electrical voltage, high electrical currents may strain components of sensor 16, and/or other related components may not be fully compatible with higher currents. In addition to (or as an alternative to) modifying the intensity of the light from the light source 20, with embodiments, the sensitivity level of the light detector 22 may be modified. The light detector 22 may include, for example, a photodiode-based transimpedance amplifier (TIA) receiver, and may be driven at various sensitivity levels that may correspond with the frequency and/or intensity of light of the light source 20. A photodiode TIA receiver may be more easily adjusted than a photo-IC and a photo transistor. Sensor 16 and/or ECU 18 may, in at least some circumstances, be configured to operate the photodiode-based TIA receiver in a linear region.

Figure 6:
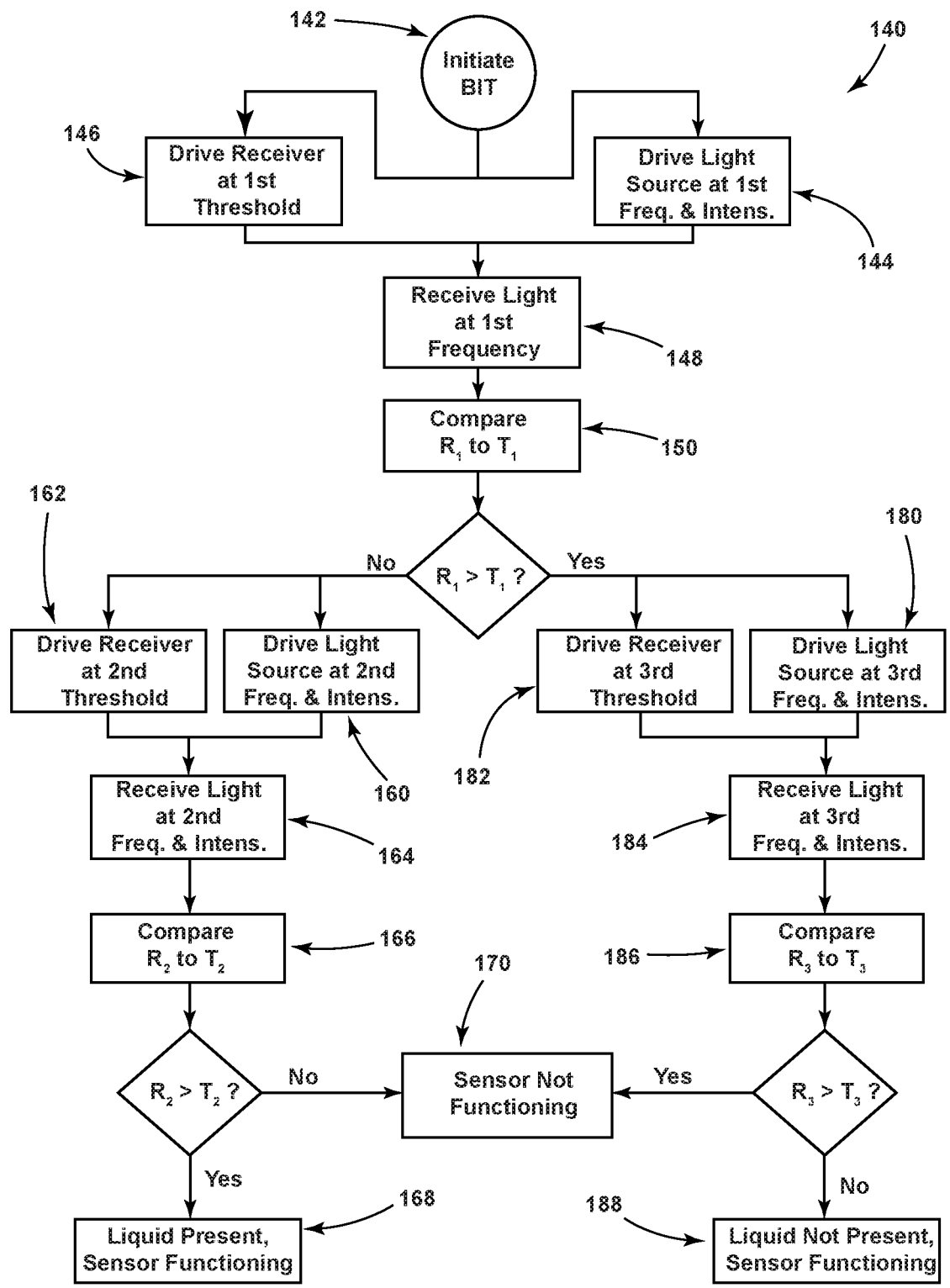
FIG. 6 is a flow chart illustrating an embodiment of a method of operating an electro-optic liquid sensor.

Referring to FIG. 6, a method 140 of operating an electro-optic sensor 16 that includes modifying light intensity and/or detector sensitivity may include initiating a built-in-test (step 142). The method may continue with driving the light source 20 at a first frequency and intensity (step 144). The frequency and intensity may be selected according to the characteristics of the components of the sensor 16 and according to the liquid to be detected. The method 140 may include driving the light detector 22 at a first sensitivity level (step 146). The method 140 may continue to a first receiving step 148 that includes receiving reflected light $R_1$ with the light detector 22 with the first sensitivity level. In a first comparison step 150, the received light $R_1$ may be compared to the first threshold $T_1$.

In embodiments, if the amount or intensity of light $R_1$ detected in the first receiving step 148 is less than the first threshold $T_1$, the method 140 may continue to a second driving step 160 that includes driving the light source 20 at a second frequency and intensity. The second frequency may be the same as the first frequency, in an embodiment. The second intensity may be the same as the first intensity, in an embodiment. In another embodiment, the second frequency and/or intensity may be different from the first frequency and/or intensity. For example only, the second intensity may be higher than the first intensity, in an embodiment. A higher intensity may be used in the second driving step than in the first driving step to ensure that, if liquid is present, the light will have sufficient energy to propagate through the liquid from the light source 20 to the optical member 26 and back to the light detector 22. The method 140 may include driving the light detector 22 at a second sensitivity level that may be the same or similar to the first sensitivity level (step 162). Additionally or alternatively, the second sensitivity of the light detector 22 may be modified (e.g., increased), which may help ensure that light is detected. Thus, as in the first driving step 144, the frequency and intensity of light and the detector sensitivity in the second driving steps 160, 162 may be selected according to the type of liquid to be detected and the characteristics of the elements of the sensor 16.

With embodiments, the method 140 may continue to a second receiving step 164 that may include receiving reflected light with the light detector 22 with the second sensitivity level. The received light may be of substantially the same frequency as that emitted by the light source 20 in the second driving step. In a second comparison step 166, the amount or intensity of light received, $R_2$, may be compared to the second threshold, $T_2$. If the amount or intensity of light received is greater than the second threshold (e.g., if $R_2 > T_2$), it may be concluded at a first conclusion step 168 that liquid is present and that the sensor 16 is functioning properly. If the amount or intensity of light received $R_2$ is not greater than the second threshold $T_2$, it may be concluded at a second conclusion step that the sensor 16 is not functioning properly (step 170). Increasing both the intensity of the light and the sensitivity of the detector (e.g., simultaneously) may achieve at least similar functionality/sensing ability and include a smaller increase in total current than configurations in which only the light intensity is increased.

With embodiments, in the first comparison step 150, if the amount or intensity of light received is greater than the first threshold (e.g., if $R_1 > T_1$), the method 140 may advance to a third light driving step 180 that may include driving the light source 20 at a third frequency and intensity, and/or a third detector driving step 182 that may include driving the light detector 22 at a third sensitivity level. The third frequency may or may not be the same as either or both of the first frequency and the second frequency, in an embodiment. The third intensity may or may not be the same as either or both of the first intensity and the second intensity, in an embodiment. In another embodiment, the third frequency, intensity, and sensitivity level may be different from (e.g., less than) either or both of the first and second frequency, intensity, and/or sensitivity. The frequency, intensity, and sensitivity level in the third driving steps 180, 182 may be selected according to the type of liquid to be detected and the characteristics of the elements of the sensor 16.

In embodiments, the method 140 may continue to a third receiving step 184 that includes receiving reflected light with the light detector 22 at the third sensitivity level. The received light may be of substantially the same frequency as that emitted by the light source 20 in the third driving step. In a third comparison step 186, the amount or intensity of light received, $R_3$, may be compared to a third threshold, $T_3$. The third threshold $T_3$ may be set to an amount or intensity of light that is higher than a properly-functioning sensor could detect given the amount or intensity of light emitted in the third driving step. If the amount or intensity of light received $R_3$ is less than the third threshold $T_3$, it may be concluded at a third conclusion step 188 that no liquid is present and that the sensor 16 is functioning properly. If the amount or intensity of light received $R_3$ is greater than the third threshold $T_3$, it may be concluded at the second conclusion step 170 that the sensor 16 is not functioning properly.

Figure 7:
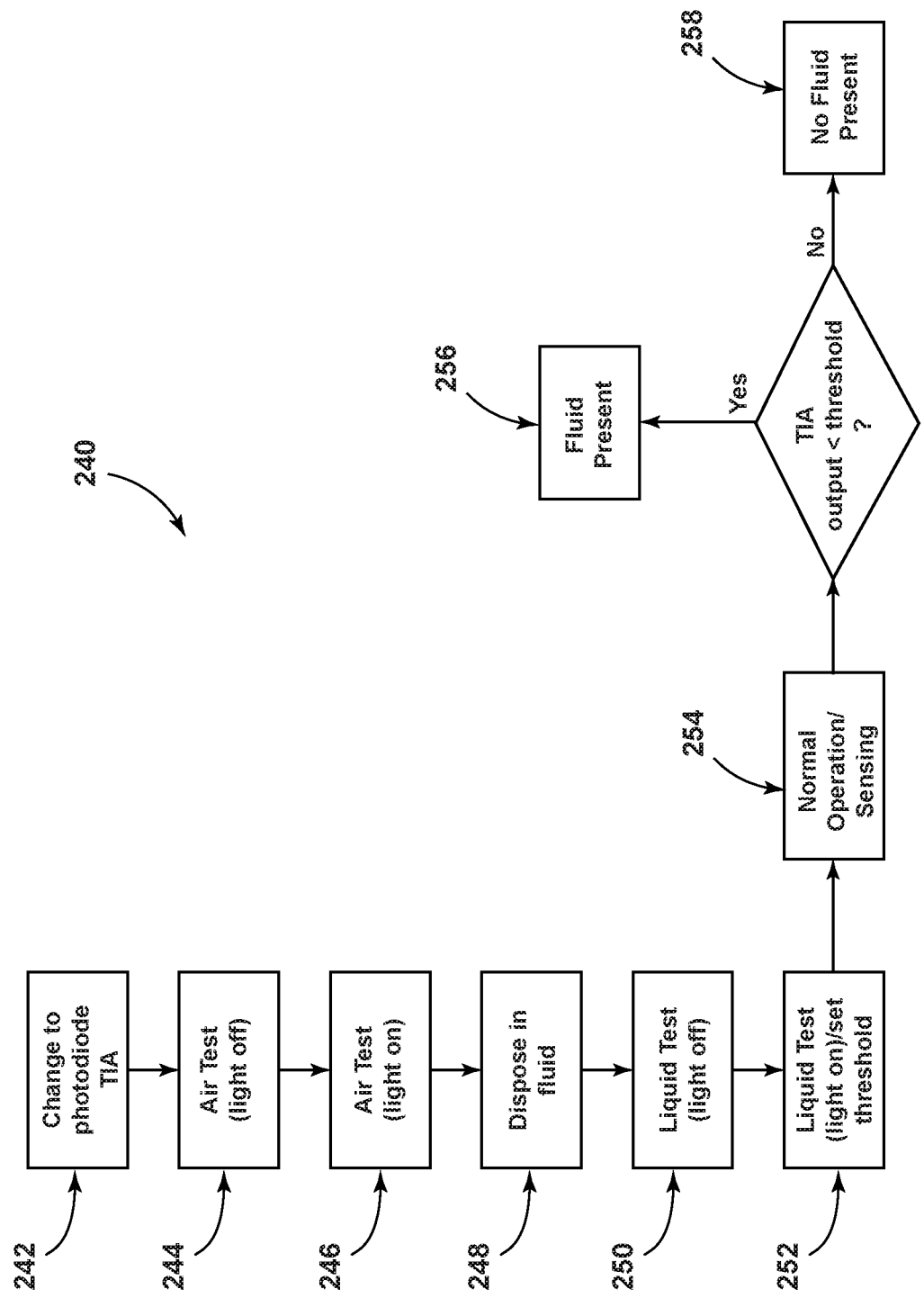
FIG. 7 is a flow chart illustrating an embodiment of a method of operating an electro-optic liquid sensor.

Referring to FIG. 7, an embodiment of a method 240 of operating an electro-optic sensor 16 is generally illustrated. In embodiments, one or more steps of the method 240 may be used for testing and/or calibration of the sensor 16 (e.g., a test mode) and one or more steps may be used for normal operation (e.g., a liquid detection mode). In a first step 242, if the light detector 22 of the electro-optic sensor 16 includes a photo-IC receiver (or some other type of receiver), a photodiode TIA receiver may be added and/or used instead. In a second step 244, in the absence of liquid (e.g., with effectively only air), and with the light source 20 off, the light detector 22 may detect a first amount of light (e.g., ambient light). If the first amount of light is above an expected amount of ambient light, which may be very little or no light, the ECU 18 may detect a malfunction, such as with the light detector 22. In a third step 246, the light source 20 may be turned on and the light detector 22 may detect a second amount of light (e.g., including reflected light from the light source 20). If the second amount of light is below an expected amount of reflected light, the ECU 18 may detect a malfunction, such as, for example, with the light source 20 and/or with the prism 24. In the third step 246, the electrical current driving the light source 20 (e.g., a nominal current) may be adjusted so that the photodiode TIA of the light detector 22 is not saturated. The method may continue to a fourth step 248 in which the sensor 16 may be disposed at least partially in a fluid and/or liquid. In a fifth step 250, the light detector 22 may detect a third amount of light with the light source 20 off. If the third amount of light is greater than an expected amount of light, the sensor 16 may detect a malfunction. In a sixth step 252, the light source 20 may be turned on and the light detector 22 may detect a fourth amount of light, which ECU 18 may use as and/or use to calculate a threshold amount that may be used during normal operation. Such a threshold may be used, for example and without limitation, for threshold $T_1$ in connection with method 140.

With embodiments, in a seventh step 254, the ECU 18 may transition the sensor 16 to normal operation (e.g., liquid detection mode). In the liquid detection mode, the light detector 22 may detect a current amount of light, which may be compared to the threshold amount. If the current amount of light detected is less than the threshold, the sensor 16 may determine that there is fluid present (step 256). If the current amount of light detected is not less than the threshold, the sensor 16 may determine that fluid is not present (step 258).

With embodiments, one or more of the steps of the method 140 and/or of the method 240 (e.g., the first through sixth steps) may be omitted, modified, and/or duplicated for certain applications. One or more steps of the method 140 and the method 240 may be carried out, at least in part, via the ECU 18.

Figure 8:
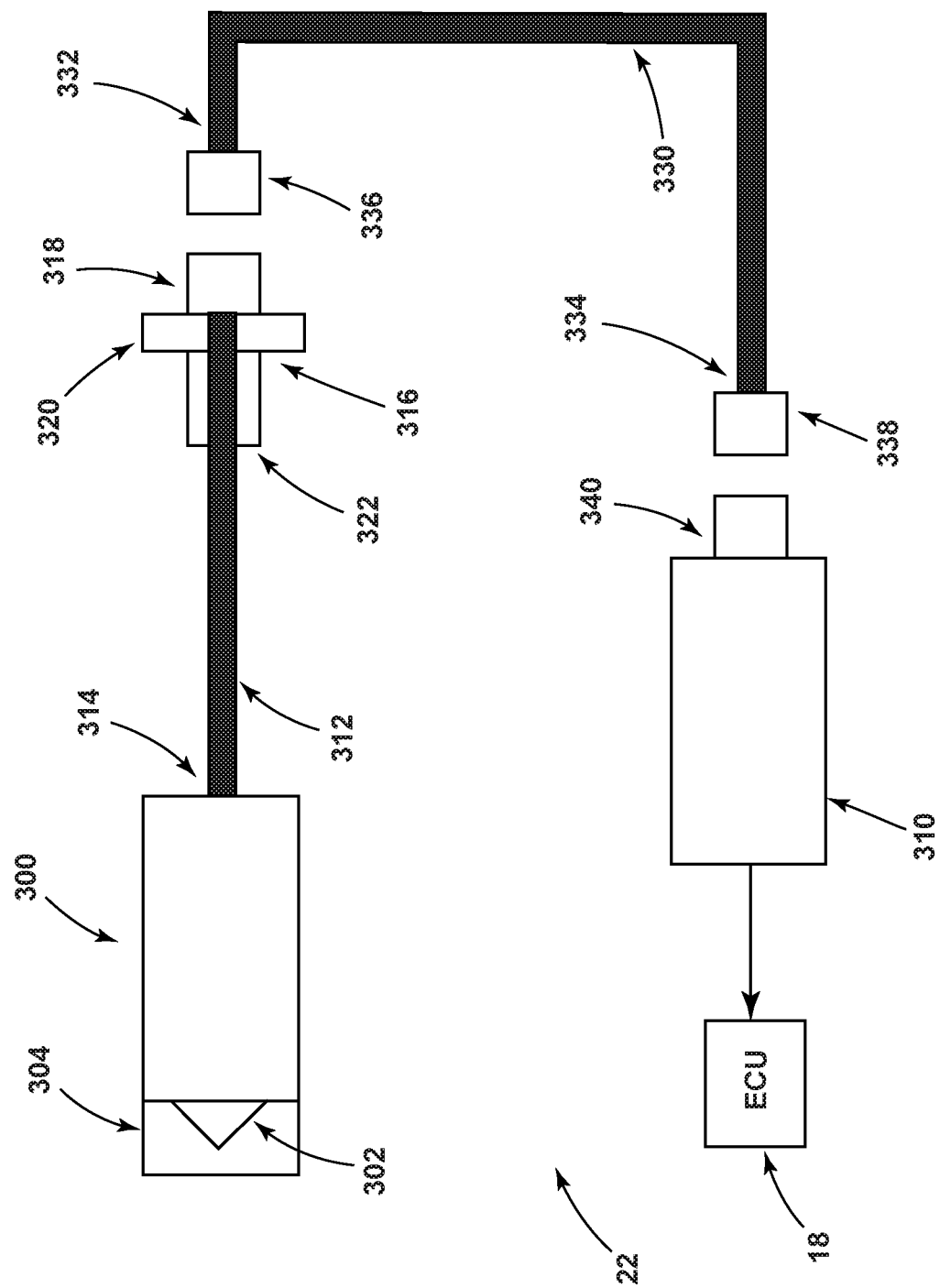
FIGS. 8 and 9 are diagrammatic views of exemplary embodiments of light detectors.
Figure 9:
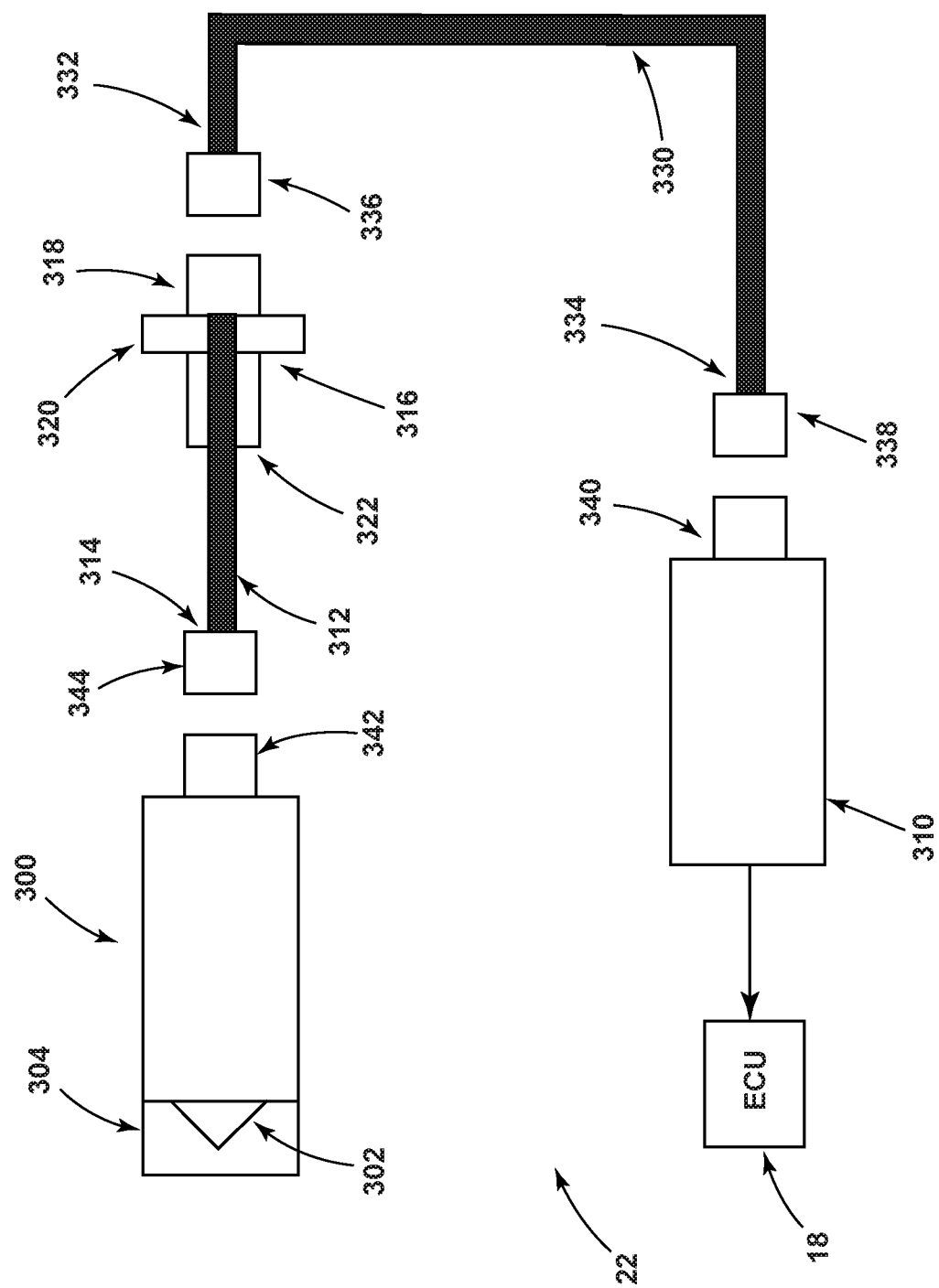

Referring to FIGS. 8 and 9, embodiments of a light detector 22 are generally illustrated. A light detector 22 may include an optical head assembly 300 with a prism 302 and/or an optical shield 304, and an electronic module assembly 310. The optical head assembly 300 may be connected to the electronic module assembly 310 via one or more fiber optic cables (or one or more connected fiber optic segments). A fiber optic cable may comprise at least a first section 312, and/or a first section 312 and a second section 330. In embodiments, the fiber optic cable may comprise a first section 312 that may be connected to the optical head assembly 300 at a first end 314 and connected to a first connector 318 at a second end 316. The first section 312 may extend and/or be connected or connecting through a wall 320 of a liquid chamber 14 (e.g., a fuel tank wall), such as via a fitting 322 (e.g., a hermetically sealed bulkhead fitting). A first end 332 of a second section 330 may be connected with a second connector 336 and a second end 334 of the second section 330 may be connected with a third connector 338. The second connector 336 may be configured for connection with the first connector 318. The third connector 338 may be configured for connection with a connector 340 of the electronic module assembly 310. In embodiments, such as generally illustrated in FIG. 9, the first section 312 may be connected to the optical head assembly 300 via a pair of corresponding connectors 342, 344.

With embodiments, the optical head assembly 300 may be configured to be disposed in a liquid chamber 14 (e.g., a tank) that may include volatile and/or explosive materials, such as fuel or other flammable chemicals or gases. A hermetically sealed bulkhead fitting 322 may prevent materials from exiting the liquid chamber 14. While the optical head assembly 300 may be disposed in a volatile environment, the electronic module assembly 310 may be disposed outside of the volatile environment (e.g., outside the liquid chamber 14), and the fiber optic cable(s) (e.g., cable sections 312, 330) may allow for communication between the optical head assembly 300 and the electronic module assembly 310. In such configurations, passive components (e.g., the optical head assembly 300, the fitting 322, and/or fiber optic cable 312) may be the only components of the sensor 16 and/or light detector 22 disposed in the volatile environment. Active components, such as the electronic module assembly 310, may be disposed outside of and/or at a safe distance from the volatile environment. Disposing only passive components in the volatile environment may significantly reduce or even eliminate the possibility of causing a spark or otherwise potentially igniting material in the volatile environment. Other designs intended to limit the possibility of a spark/ignition may not be as effective, may be more expensive, and/or may be more complicated/time consuming.

With embodiments, the one or more fiber optic cable(s) (e.g., cable sections 312, 330) of the light detector 22 may include a single fiber. The electronic module assembly 310 may be configured to separate incoming signals received via the single fiber. The received signals may correspond to light received, such as from the light source 20, and may include an intensity and/or a frequency. The electronic module assembly 310 may be configured to provide an output corresponding to the amount, intensity, and/or frequency of light received at the optical head assembly 300. The electronic module assembly 310 may be connected to and/or incorporated with the ECU 18. Fiber optic cables, including single fiber cables, may be relatively lightweight (e.g., up to or about 10 times lighter) compared to copper wiring, which may allow for greater cable lengths to be used (and for the electronic module assembly 310 to be disposed at greater distances from the optical head assembly 300 and/or at more convenient locations). Lighter cables may be particularly advantageous in applications in which weight is a significant design factor (e.g., airplanes). Fiber optic cables may also be smaller (e.g., in diameter) and/or more flexible than copper wiring.

Figure 10:
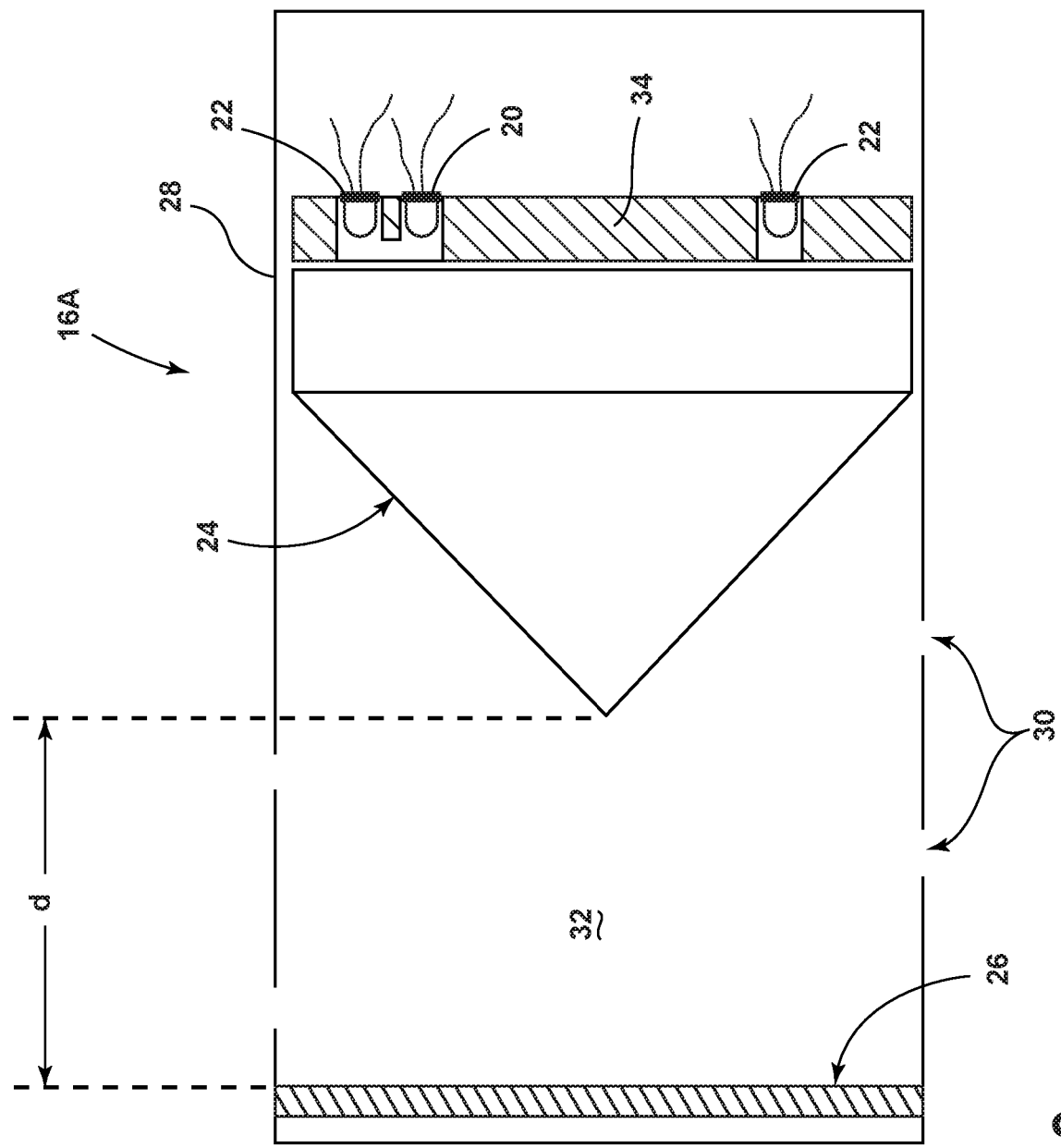
FIGS. 10 and 11 are diagrammatic views of embodiments of an electro-optic liquid sensor.
Figure 11:
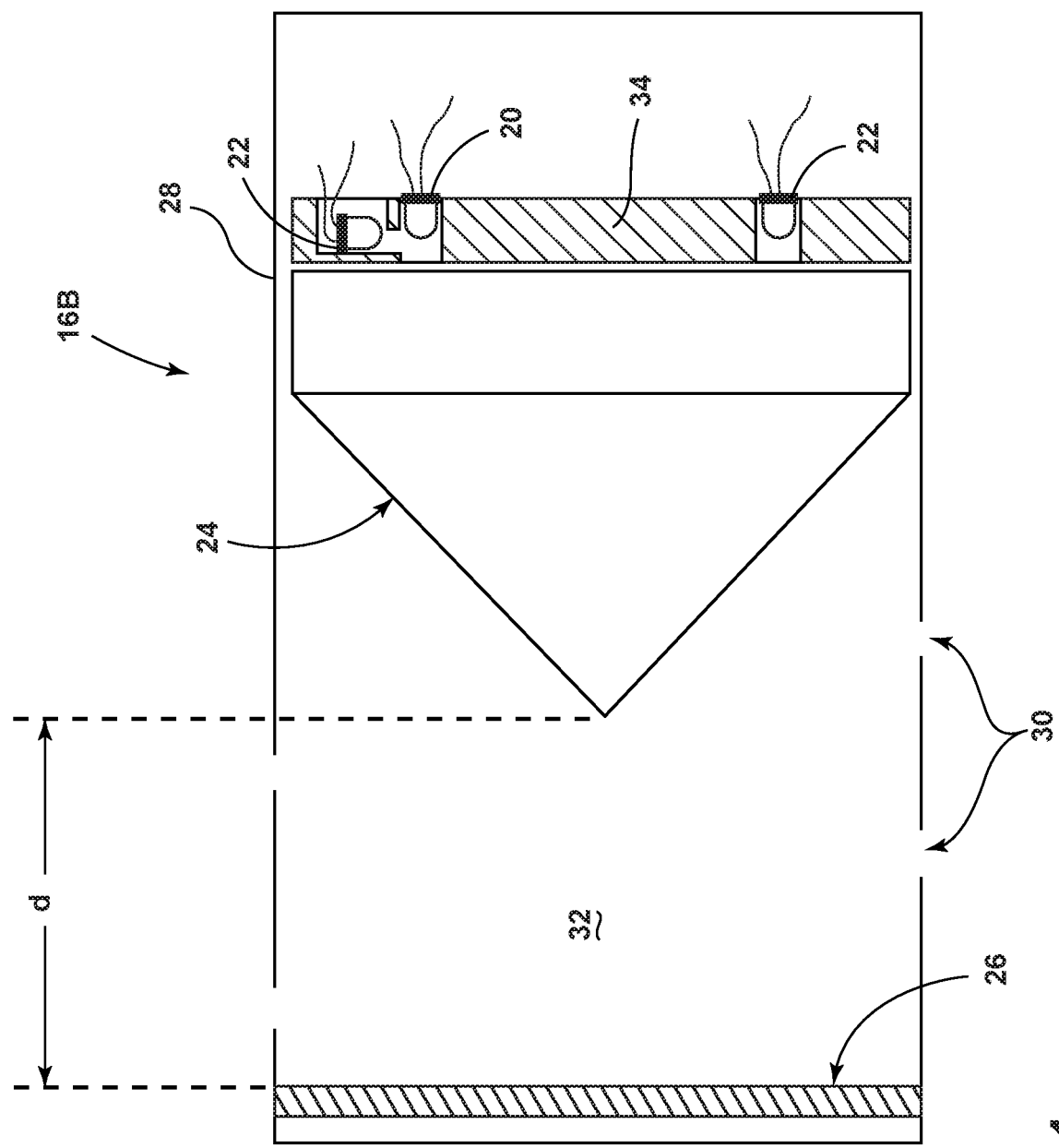

FIGS. 10 and 11 are diagrammatic views of embodiments of electro-optic liquid sensors, which are generally indicated as 16A and 16B, respectively. The sensor 16A,16B may include a light source 20, a photo sensor (or light detector) 22, a prism 24, and/or a reflective optical member 26 (which may also be referred to as an optical shield), which may be generally disposed within a housing 28. The housing 28 may include one or more liquid ports 30 for permitting liquid to flow into and out of a chamber 32 of the housing 28. Additionally, the chamber 32 may define a gap between the prism 24 (or an extent thereof) and the optical member 26, such as generally illustrated in connection with dimension d. For example, and without limitation, in an embodiment, d may be about an inch or less. Of course, other dimensions may be employed as appropriate for particular applications.

In embodiments, such as generally illustrated in FIGS. 10 and 11, electro-optic liquid sensors may include an optically isolating chassis 34. With embodiments, an optically isolating chassis 34 may, for example, be disposed between two separate photo sensors 22 and/or between a photo sensor 22 and a light source 20. Moreover, an optically isolating chassis may additionally be disposed on a side of the same side of a prism 24 as a light source 20 and/or opposite a reflective optical member 26. Additionally, as generally illustrated, one or more photo sensors and a light source may be provided between portions or segments of an optically isolating chassis.

With embodiments, an LED may be used to change a light intensity (e.g., high/low) as necessary or desired to interrogate a sensor with respect to an in-fluid or an in-air state. The sensors may use a photo-IC (e.g., a photo diode-based sensor) and/or may use a transistor. With an LED, a high dynamic range (e.g., to allow for reliable fluid absence/presence detection) may be achieved by applying a relatively high current to an LED. However, with some embodiments, a BIT function may be modified or improved to include an optical power compensation circuit (such as a photo diode), which may provide for more consistent/continuous interrogation of a light source irrespective of a sensor's physical environment (e.g. in-air or in-fluid). With embodiments, the inclusion of a photo diode based circuit, which may operate in a linear region may address certain limitations. The inclusion of a timing circuit may cap an amount of energy that is permitted through a circuit. Among other things, including a photo diode based circuit may provide for a better operational dynamic range, may reduce sensor power management requirements, may improve sensor reliability (for example by lowering thermal stresses on primary components), many improve sensor safety in fuel/gaseous environments, and/or may better control sensor threshold sensitivity.

Figure 12:
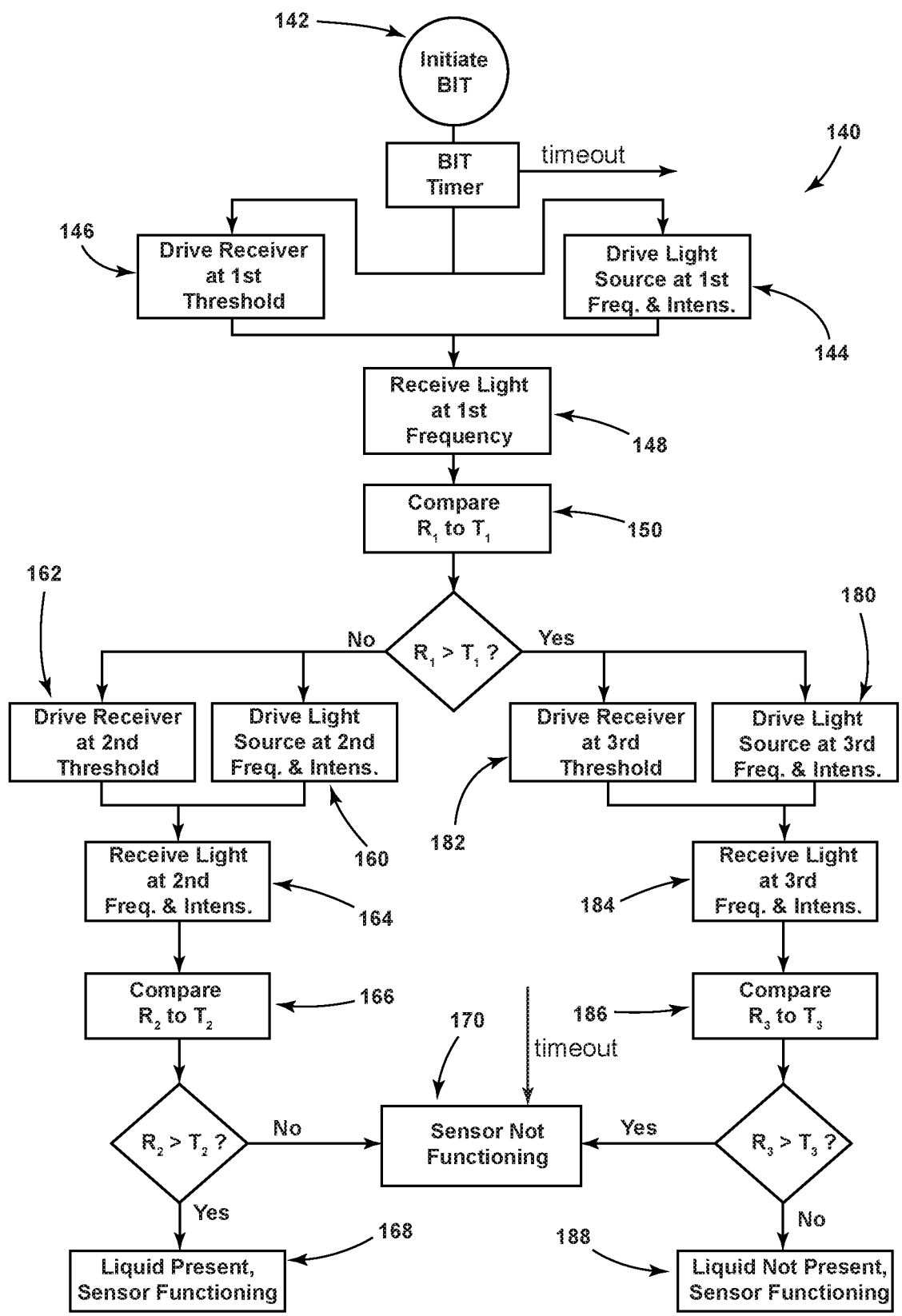
FIG. 12 is a flow chart illustrating an embodiment of a method of operating an electro-optic liquid sensor.

Referring to FIG. 12, an embodiment of a method 140 of operating an electro-optic sensor 16 is generally illustrated. The method may have a number of similarities to the method disclosed in connection with FIG. 6. However, the illustrated embodiment of FIG. 12 includes, inter alia, a timer that may be associated with and/or follow a built-in-test step (e.g., step 142). If there is no timeout occurrence or event associated with the timer, the method may proceed with (i) driving receiver at $1^{st}$ threshold (step 146) and/or (ii) driving light source at $1^{st}$ frequency and intensity (step 144). However, if there is a timeout occurrence or event associated with the timer, the methods may move to a timeout related action (for example, step 170—which may, for example, indicate that a sensor is not functioning.

Figure 13:
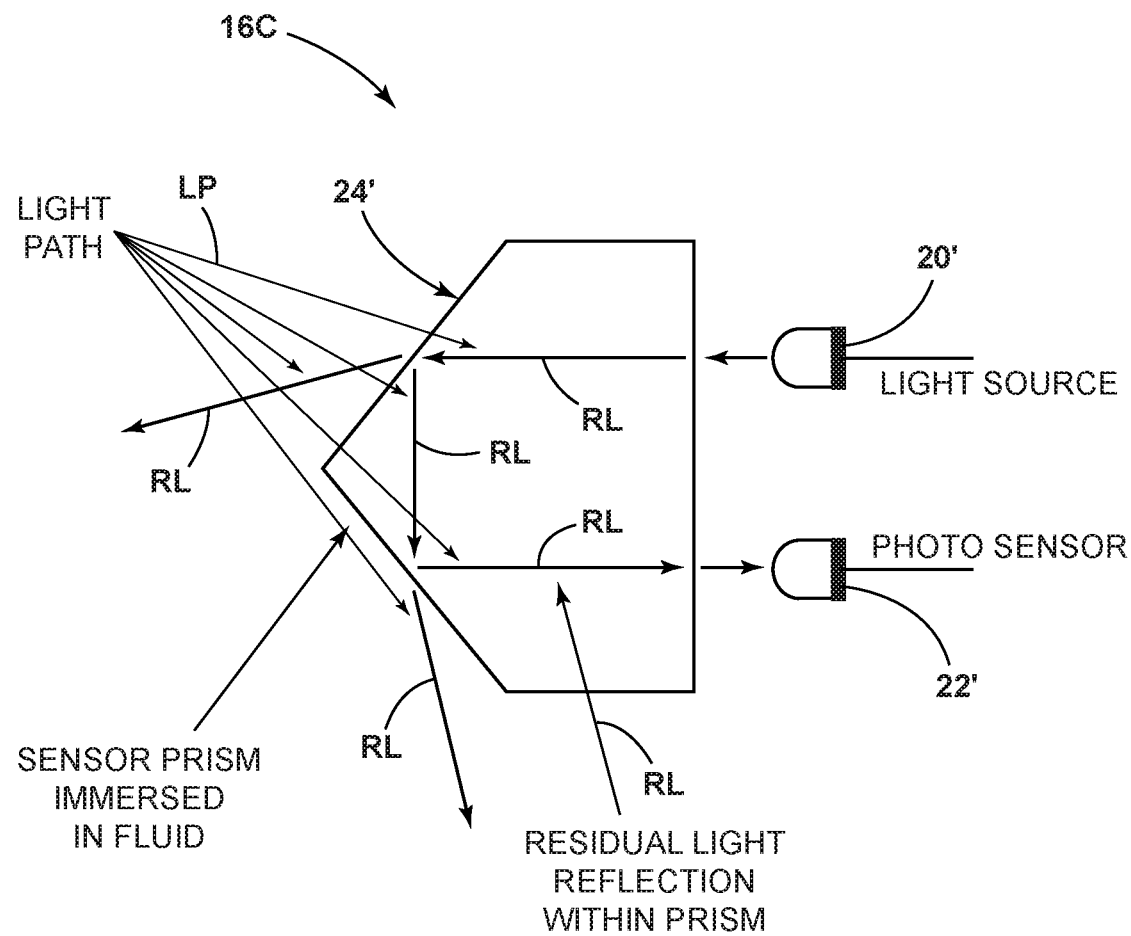
FIG. 13 is a diagrammatic view of an embodiment of an in-liquid electro-optic testing configuration/arrangement.

FIG. 13 is a diagrammatic view of an embodiment of an in-liquid electro-optic testing configuration/arrangement, which is generally indicated as 16C. The configuration/arrangement 16C may include a sensor prism 24', a light source 20', and a photo sensor 22'. With respect to FIG. 13, a light path (LP) is shown in a fluid. As generally indicated, a sensor prism 24' may be immersed in a fluid. Additionally, as generally shown, residual light reflection (RL) within the prism may be directed as indicated. Such residual light reflection (RL) may comprise an always present low level light signal.

With embodiments, including those disclosed herein, a system can be provided that, inter alia, monitors sensor performance (e.g., health) continuously (e.g., in real time) regardless of whether a sensor head is in liquid or in air.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A method of operating an electro-optic sensor, the method comprising:
   providing and electro-optic sensor including a housing; a light source disposed within the housing; a prism disposed within the housing; a primary photo sensor or light detector and a secondary photo sensor or light detector; an optically isolating chassis disposed on the same side of the prism as the light source; wherein the light source and the secondary photo sensor or light detector are separated from the primary photo sensor or light detector by the optically isolating chassis; and the secondary photo sensor or light detector is configured to interrogate the light source;
   disposing at least a portion of the electro-optic sensor in a liquid chamber;
   providing light from the light source of the electro-optic sensor at a first intensity;
   driving the primary photo sensor or light detector of the electro-optic sensor at a first sensitivity level;
   receiving, via the primary photo sensor or light detector, a first amount of light from the light source;
   determining whether liquid is present in the liquid chamber according to the first amount of light;
   providing light from the light source at a second intensity;
   driving the primary photo sensor or light detector at a second sensitivity level;

receiving, via the primary photo sensor or light detector, a second amount of light from the light source; and confirming whether liquid is present in the liquid chamber according to the second amount of light;

wherein the first sensitivity level is different from the second sensitivity level.

2. The method of claim 1, wherein determining whether liquid is present in the liquid chamber according to the first amount of light includes comparing the first amount of light to a threshold value, determining that liquid is present if the first amount of light is greater than the threshold value, and determining that liquid is not present if the first amount of light is not greater than the threshold value.

3. The method of claim 2, wherein, if the first amount of light is greater than the threshold value, the second intensity is greater than the first intensity and the second sensitivity level is more sensitive than the first sensitivity level, and confirming whether liquid is present in the liquid chamber includes confirming that liquid is present if the second amount of light is greater than a second threshold value and determining an error has occurred if the second amount of light is not greater than the second threshold value.

4. The method of claim 3, wherein, if the first amount of light is not greater than the threshold value, the second intensity is less than the first intensity and the second sensitivity level is less sensitive than the first sensitivity level, and confirming whether liquid is present in the liquid chamber includes confirming that liquid is not present if the second amount of light is less than a third threshold value and determining an error has occurred if the second amount of light is not less than the third threshold value.

5. The method of claim 1, wherein the electro-optic sensor includes a prism and a reflective optical member, wherein the reflective optical member is arranged to reflect light emitted by the light source to the light detector when a liquid is disposed between the light source and the reflective optical member.

6. The method of claim 1, wherein the light detector includes an optical head assembly disposed in the liquid chamber and an electronic module assembly disposed outside of the liquid chamber.

7. The method of claim 6, wherein the optical head assembly is connected to the electronic module assembly via one or more fiber optic cables.

8. An electro-optic sensor, comprising:
a housing;
a light source disposed within the housing;
a prism disposed within the housing;
a primary photo sensor or light detector and a secondary photo sensor or light detector;
an optically isolating chassis disposed on the same side of the prism as the light source;
wherein the light source and the secondary photo sensor or light detector are separated from the primary photo sensor or light detector by the optically isolating chassis; and the secondary photo sensor or light detector is configured to interrogate the light source.

9. The electro-optic sensor of claim 8, wherein the housing includes a chamber and one or more ports permitting flow into and/or out of the chamber.

10. The electro-optic sensor of claim 8, including a reflective optical member disposed within the housing, wherein a gap is provided between the prism and the reflective optical member.

11. The electro-optic sensor of claim 10, wherein the modification or control of the intensity associated with the light source provides consistent optical power outage from the light source irrespective of the physical environment of the electro-optic sensor.

12. The electro-optic sensor of claim 8, wherein an intensity of the light source may be changed with respect to a state or physical environment associated with the electro-optic sensor.

13. The electro-optic sensor of claim 8, wherein interrogation of the light source by the secondary photo sensor or light detector provides a feedback loop to modify or control an intensity associated with the light source.

14. The electro-optic sensor of claim 13, wherein the interrogation of the light source by the secondary photo sensor or light detector is continuous.

15. The electro-optic sensor of claim 8, wherein the light source comprises an LED.

16. The electro-optic sensor of claim 15, wherein the LED provides a high dynamic range via a high current applied to the LED.

17. The electro-optic sensor of claim 8, wherein the primary photo sensor or light detector and/or the secondary photo sensor or light detector comprise a photo IC and/or a transistor.

18. The electro-optic sensor of claim 8, including a timer that is associated with and/or follows a built-in-test step driving a frequency and intensity of the light source.

19. The electro-optic sensor of claim 8, including a timing circuit configured to limit an amount of energy associated with the electro-optic sensor.

20. The electro-optic sensor of claim 8, wherein the primary photo sensor or light detector and/or the secondary photo sensor or light detector comprise a single fiber.

* * * * *